Feb. 11, 1958 R. F. CASEY 2,823,274

ADJUSTABLE SWEEP CIRCUIT

Filed Aug. 4, 1954

INVENTOR.
ROBERT F. CASEY
BY Darby & Darby
ATTORNEYS

United States Patent Office 2,823,274

Patented Feb. 11, 1958

2,823,274

ADJUSTABLE SWEEP CIRCUIT

Robert F. Casey, Pompton Plains, N. J., assignor to Allen B. Du Mont Laboratories, Inc., Clifton, N. J., a corporation of Delaware Application August 4, 1954, Serial No. 447,742

11 Claims. (Cl. 250—27)

Figure 1:
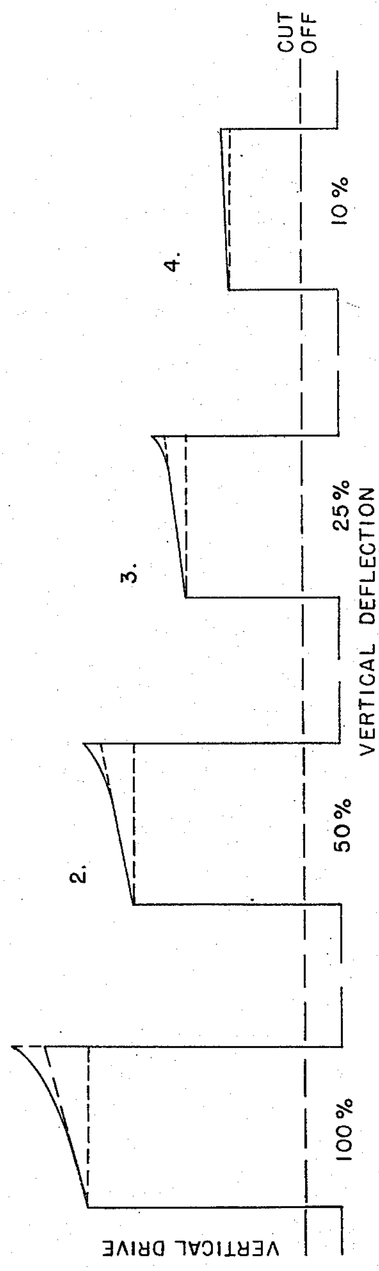

This invention relates to improvements in adjustable sweep circuits with special relation to sweep circuits for generating sweep signals for the vertical control of the electron beam of a cathode ray tube.

In its broader aspects the invention is concerned with a control current generator having a waveform which is the composite of three components, one of rectangular waveform, one of sawtooth waveform, and one of exponential waveform.

Still from a broad viewpoint, another object of this invention is to provide a generator of composite waveform of this type which is especially applicable as a deflection control signal in the operating of cathode ray tubes.

Another object of the invention is to provide a circuit combination for this purpose by means of which the output signal may be adjusted in amplitude.

Theoretically a sawtooth current in the vertical winding, for example, of the deflection yoke of a cathode ray tube is produced by a rectangular input waveform. However, when the actual resistance of the yoke and of the transformer used in connection therewith are taken into consideration, there is required, in addition to an input signal having a rectangular input waveform, a sawtooth waveform. The sawtooth component should have the characteristic of increasing in slope as its amplitude is increased. Finally, in addition to these requirements and in order to compensate for the non-linearity of the cathode ray tube and the transformer an additional component of arbitrary waveform resembling an exponential wave must be superimposed upon the input waveform having rectangular and sawtooth wave components. It is necessary that the amplitude of this exponential or quasi-exponential component also change along with the amplitudes of the other components. As those skilled in the art will understand, the exponential component is provided to compensate for the magnetic saturation of the transformer. A non-saturating transformer would of necessity contain so much iron as to render the device too bulky and heavy. One purpose of this invention is to provide circuit compensating means to avoid the need for a non-saturating transformer.

Likewise, in circuits of this kind linear adjustment of the vertical amplitude requires a multiplicity of controls and manipulation.

In view of these difficulties another object of this invention is to provide a vertical sweep circuit having means for effecting simple adjustment of the amplitude of the output signal.

Another object is to provide a circuit with good linearity throughout the working range.

It is still another object of the invention to provide the above-mentioned linear amplitude adjustment with but one master control.

Other objects of this invention will be apparent from the following disclosure of the embodiment thereof illustrated in the attached drawings.

Figure 2:
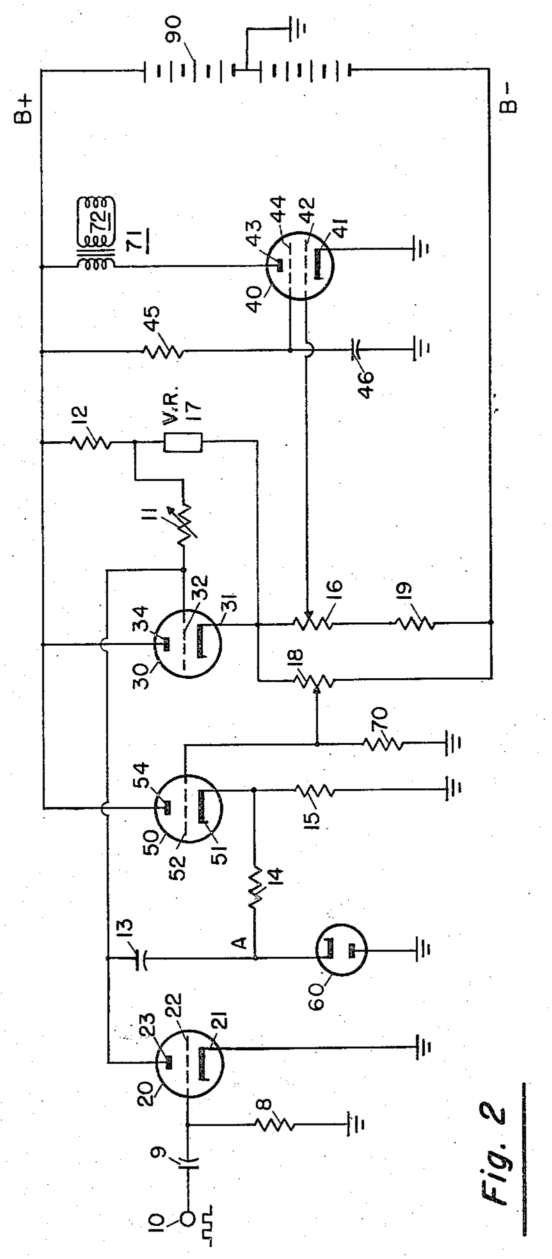

In the drawings,

Figure 1 is a chart illustrating for different percentages of deflection, vertical deflection in the case illustrated, the type of component waveforms generated by the invention herein disclosed; and Figure 2 is a diagrammatic and schematic illustration of one practical embodiment of the invention.

In this description it will be understood that "upvolting" is defined as raising the potential but not necessarily to a positive value. Similarly, "downvolting" means lowering the potential but not necessarily to a negative value.

As will be apparent from the study of Figure 1, the individual curves 1, 2, 3 and 4, illustrated therein, show diagrammatically the relative forms of the three components of each wave for 100%, 50%, 25%, and 10% of full deflection. The dotted lines are used to aid in separating the component waveforms while the dashed lines indicate the cut-off.

The purpose of this invention is to provide a circuit combination such as that illustrated in Figure 2, wherein the three required components illustrated in Figure 1 are generated with means provided to effect separate adjustment of each component for individual conditions.

As illustrated in Figure 2, a suitable source of gating signal is applied to the input terminal 10. This terminal is coupled by any suitable means such as a capacitor 9 and resistor 8 to the control electrode 22 of an electron tube 20. Its cathode 21 is grounded while its anode 23 is connected to the control electrode 32 of an electron tube 30. Control electrode 32 is also connected through a variable resistor 11 and a fixed resistor 12 to the positive side B+ of a suitable source of operating potential 90 which has a mid-point grounded as shown.

Its anode 34 is also connected to B+ and its cathode 31 is connected to B— through a potentiometer 16 and a fixed resistor 19. A voltage regulator 17 is connected between the common terminal of resistors 11 and 12 to the cathode 31.

A third electron tube 50 has its anode 54 connected to B+ and its cathode 51 to ground through a fixed resistor 15. The control electrode 52 is connected to ground through a fixed resistor 70. The grid is directly connected to the movable contact of potentiometer 18 which is connected across cathode 31 and B— as shown. The connection between anode 23 and control electrode 32 is connected to one side of a sweep capacitor 13, the other side of which is connected to the cathode of a grounded uni-directional conductor device 60 such as a diode or its equivalent. A connection between the capacitor 13 and the cathode 51 includes a fixed resistor 14.

Cathode 31 represents the output terminal of this circuit and is shown connected to the control electrode 42 of an output electron discharge device 40. Its cathode 41 is connected to ground and its anode 43 is connected to B+ through the primary of a transformer 71, whose secondary is connected to the deflection yoke 72. Its screen grid 44 is connected to B+ through a resistor 45 and ground through a capacitor 46.

In the operation of this circuit it is apparent that a gating signal, in this case a rectangular pulse, is applied to the input terminal 10 and through the coupling circuit 8—9 to the control electrode 22 of the electron tube 20 which operates as a switch tube. During the positive portion of the gating signal switch tube 20 and tube 30 are both conductive. but during the negative portion of the gating signal switch tube 20 is cut-off and the current which had been flowing through the switch tube is diverted to flow through capacitor 13 and resistors 14 and 15. The voltage drop at the point A appearing across the resistors 14 and 15 suddenly "upvolts" control electrode 32, and by cathode follower action cathode 31 is also quickly "upvolted." This cathode represents the output terminal of the generator and a desired portion of this output signal depending upon the adjustment of a potentiometer 16 is applied to the control electrode of the output tube 40. The amplitude of this signal can also be controlled by the adjustment of variable resistor 11.

At the same time the current diverted to capacitor 13 linearly charges it by the action of the voltage regulator 17 and the cathode follower action of tube 30 in the manner of the linearizing charging circuit. A positive going sawtooth sweep voltage is also developed at control grid 32. Cathode follower action produces the same waveform at cathode 31 which is also applied through the potentiometer 16 to the control electrode 42 of the output tube 40. Thus this circuit provides the required second waveform component, that is, the sawtooth. It is apparent that the amplitude of this component is also controlled by the adjustment of potentiometer 16 and variable resistor 11.

During the preceding events tube 50 has been non-conductive. However, as the voltage at cathode 31 is increased control electrode 52 is "upvolted" to the point to permit conduction, which point is controlled by the adjustment of potentiometer 18. It will be seen then that a regenerative loop is provided. Cathode 51 is "upvolted" to follow its control electrode 52 which upvolting in turn is transmitted through resistor 14 and capacitor 13 to the control electrode 32 which by cathode follower action upvolts cathode 31 in turn upvolting grid 52. Due to the resulting regeneration a rapidly increasing voltage appears at cathode 31 and it too is applied to the control electrode 42 of the output tube 40 through the potentiometer 16. The instant at which tube 50 becomes conductive depends upon the voltages of cathode 51 and control electrode 52. The voltage of the former varies with the amplitude of the rectangular waveform component while the voltage of the latter depends in part on the combined amplitudes of the rectangular and sawtooth waveform components. The amplitudes of both of these components are controlled by the variable resistor 11. It will be recognized therefore that the master control is provided by the adjustable resistor 11 while minor control of these waveform components is obtained by potentiometer 18 and the circuit constants.

As was apparent from the foregoing the sweep voltage appears across sweep capacitor 13 while switch tube 20 is non-conductive. At the end of the sweep, switch tube 20 is rendered conductive by the input signal applied to the input terminal 10. Anode 23 and the upper plate of sweep capacitor 13 is thereby effectively placed at ground potential, and the lower plate of sweep capacitor 13, i. e., point A, is below ground potential. Therefore, in order to permit faster discharge of the sweep capacitor 13 diode 60 is connected, as shown, of such polarity as to become conductive during retrace.

Returning to the output portion, it will be seen that the three required waveform components applied through control electrode 42 of the output tube 40 appear in its output circuit and are applied to the deflection yoke in the case of the use of this invention in the operation of cathode ray tubes.

From the above description it will be apparent to those skilled in the art that the invention as disclosed is subject to modification by equivalent changes and I prefer therefore to be limited only as required by the appended claims. By way of further example it is apparent that the circuit herein disclosed is capable of generating an output signal of the waveforms disclosed for general use and are not limited specifically for vertical sweep circuits and, in fact, not necessarily limited to the operation of cathode ray tubes.

What is claimed is:

1. A waveform generator comprising: means to produce a pulse waveform and a sawtooth waveform, said means comprising a series-connected capacitance and resistance and means for charging said series-connected elements whereby the charging current produces said pulse waveform across said resistance and said sawtooth waveform across said capacitance; means to produce a quasi-exponential waveform; and means to combine said three waveforms.

2. The circuit of claim 1 wherein said means for producing said quasi-exponential waveform comprises a regenerative loop.

3. A circuit for generating a composite voltage waveform having a pulse component, a sawtooth component, and a quasi-exponential component, said circuit comprising: a source of charging potential; a series-connected capacitance and resistance; means causing said source to cause a charging current to flow through said series-connected elements whereby the charging current produces said pulse components across said resistance and said sawtooth component across said capacitance; means to produce a quasi-exponential component, said means adapted to be energized by said pulse and sawtooth components; means to combine said three components; and means to vary the amplitude of said components, said means consisting of a single control element which controls the charging current.

4. A circuit for generating a composite voltage waveform having a pulse component, a sawtooth component, and a quasi-exponential component, said circuit comprising: a source of charging potential; a series-connected capacitance and resistance; means causing said source to cause a charging current to flow through said series-connected elements whereby the charging current produces said pulse component across said resistance, and said sawtooth component across said capacitance; an amplifier having an input and an output electrode; means to apply said pulse and sawtooth waveform components to said input electrode; means to produce a quasi-exponential waveform, said means comprising a regenerative loop; means to apply the output of said amplifier ot said loop; and means to combine said three components into said composite voltage waveform.

5. The circuit of claim 4 including means to vary the relative amplitudes of said components.

6. A circuit for generating a composite voltage waveform having a pulse component, a sawtooth component, and a quasi-exponential component, said circuit comprising: a source of charging current; a capacitor, and a resistor connected in series; means to apply said charging current to said capacitor and resistance whereby said charging current produces said sawtooth component across said resistor; an amplifier having an input terminal and an output terminal; means to apply said sawtooth component and said pulse component to said input terminal; means to produce a quasi-exponential component; means to disable said last means until said components have reached a predetermined amplitude; means to cause said quasi-exponential producing means to add an increasingly large current to said charging current thereby generating said quasi-exponential component; and means to combine said components into said composite waveform.

7. A circuit for generating a composite voltage waveform having a pulse component, a sawtooth component, and a quasi-exponential component, said circuit comprising: a source of charging current; a capacitor and a resistor connected in series; means to apply said charging current to said capacitor and resistance whereby said charging current produces said sawtooth component across said resistor; an amplifier tube having an input terminal and an output terminal; means to apply said sawtooth component and said pulse component to said input terminal; means to produce a quasi-exponential component, said means comprising an electron discharge device having a grid and an output electrode; a connection between said grid and the output terminal of said amplifier; a connection between said output electrode and the input terminal of said amplifier; means causing said device to become conductive and add an increasingly large current to said charging current when said components have reached a predetermined amplitude; whereby said quasi-exponential component is produced; and means to combine said components into said composite waveform.

8. The circuit of claim 7 in which said means for applying said charging current comprises means to simultaneously vary the amplitude of said pulse component, said sawtooth component, and said quasi-exponential component, said means comprising a single control to vary said charging current.

9. The circuit of claim 7 including means to allow said capacitor to periodically charge and discharge; and means providing a discharge path to allow said capacitor to discharge more quickly.

10. A circuit for generating a composite voltage waveform having a pulse component, a sawtooth component, and a quasi-exponential component, said circuit comprising: a series-connected capacitor resistor network having one end of said resistor connected to ground; means causing a current to flow through said capacitor resistor network whereby said current develops a rectangular voltage waveform across said resistor and a sawtooth waveform across said capacitor; an output tube connected as a cathode follower, said tube having the fixed terminals of a potentiometer connected so that said potentiometer acts as its cathode load, a grid connected to said ungrounded end of said network, and a cathode connected to an output terminal; means, including a regenerative loop, to develop a quasi-exponential waveform, said regenerative loop including a third electron tube connected as a cathode follower, said tube having a grid connected to the slider of said potentiometer, and a cathode connected to the common junction of said capacitor and said resistor; and adjustable control means for establishing the amplitude of said composite waveform, said means controlling said current; whereby when said control is adjusted to vary said amplitude, disproportionate corresponding changes occur at the amplitudes of said rectangular, sawtooth, and quasi-exponential components.

11. The circuit of claim 7 including means causing said capacitor to periodically charge and discharge.

References Cited in the file of this patent

UNITED STATES PATENTS

| | | |
|---|---|---|
| 2,110,245 | Stocker | Mar. 8, 1938 |
| 2,271,876 | Seeley | Feb. 3, 1942 |
| 2,448,069 | Ames et al. | Aug. 31, 1948 |
| 2,448,070 | Sunstein | Aug. 31, 1948 |
| 2,492,018 | Sunstein | Dec. 20, 1949 |
| 2,532,534 | Bell | Dec. 5, 1950 |
| 2,536,853 | Moore et al. | Jan. 2, 1951 |
| 2,556,179 | Grieg et al. | June 12, 1951 |
| 2,570,875 | Sink | Oct. 9, 1951 |
| 2,659,837 | Murdock | Nov. 17, 1953 |
| 2,661,420 | Woodruff | Dec. 1, 1953 |